US006765684B2

(12) United States Patent
Imaizumi

(10) Patent No.: US 6,765,684 B2
(45) Date of Patent: Jul. 20, 2004

(54) SURFACE SHAPE MEASUREMENT APPARATUS

(75) Inventor: Satoshi Imaizumi, Anjo (JP)

(73) Assignee: Nidek Co., Ltd, Gamagori (JP)

( * ) Notice: Subject to any disclaimer, the term of this patent is extended or adjusted under 35 U.S.C. 154(b) by 25 days.

(21) Appl. No.: 10/106,071

(22) Filed: Mar. 27, 2002

(65) Prior Publication Data

US 2002/0163651 A1 Nov. 7, 2002

(30) Foreign Application Priority Data

Mar. 30, 2001 (JP) ........................................ 2001-100314

(51) Int. Cl.[7] .............................................. G01B 11/25
(52) U.S. Cl. ..................................................... 356/605
(58) Field of Search ................................. 356/605, 618, 356/511

(56) References Cited

U.S. PATENT DOCUMENTS 5,075,562 A * 12/1991 Greivenkamp et al. ...... 356/614
5,187,539 A * 2/1993 Adachi et al. ............... 356/605
5,289,264 A * 2/1994 Steinbichler ................. 356/605
5,636,025 A * 6/1997 Bieman et al. .............. 356/619
5,671,050 A    9/1997 de Groot

FOREIGN PATENT DOCUMENTS

JP    A 8-226806    9/1996
JP    A 8-313230    11/1996

* cited by examiner

Primary Examiner—Zandra Smith
Assistant Examiner—Kara Geisel
(74) Attorney, Agent, or Firm—Oliff & Berridge, PLC

(57) ABSTRACT

A surface shape measurement apparatus for measuring a shape of an object to be examined by a simple mechanism for rotating a reference grid. The apparatus comprises a stage on which the object is rested, a reference grid disposed in parallel to the stage, illumination means for illuminating the reference grid and projecting an grid pattern onto the object surface, photographing means for photographing the grid pattern projected onto the object surface through the reference grid and obtaining an image of moiré fringes, rotation means for rotating the reference grid about an axis normal to a grid surface of the grid plate, and analysis means for analyzing the shape of the object surface based on information about a rotation angle of the reference grid and intensity of the moiré fringes.

6 Claims, 3 Drawing Sheets

SURFACE SHAPE MEASUREMENT APPARATUS

BACKGROUND OF THE INVENTION

1. Field of the Invention

The present invention relates to a surface shape measurement apparatus for measuring a shape of a surface of an object to be examined.

2. Description of Related Art

When light is irradiated onto a surface of an object to be examined, through a reference grid formed with a predetermined spacing, and the object surface is observed through the reference grid from a direction different from a direction of the light irradiation, moiré fringes are obtained (observed) due to the reference grid and a grid pattern projected on the object surface. A shape of the object surface can be measured based on the moiré fringes. As a method for measuring it, a phase shift method has been known, under which moiré fringes are shifted by causing a minute displacement of a distance between a reference grid and an object surface to be measured.

However, the above-described method involves the following problem. For example, measuring a shape of a surface of a semiconductor wafer being 300 mm in diameter require a reference grid which is commensurate in size with the wafer; it may be difficult to cause a minute movement of such a large-sized reference grid in parallel to the object surface with good accuracy. In addition, translating the reference grid to measure up to a required degree of measurement accuracy will entail a complicated mechanism.

SUMMARY OF THE INVENTION

The present invention has been made in view of the above circumstances and has an object to overcome the above problems and to provide a surface shape measuring apparatus with which a shape of a surface of a large-sized object to be examined can be measured by a simple mechanism.

To achieve the objects and in accordance with the purpose of the present invention, as embodied and broadly described herein, a surface shape measurement apparatus for measuring a shape of a surface of an object to be examined is provided with: a stage on which the object is rested; a reference grid disposed in parallel to the stage; illumination means for illuminating the reference grid and projecting a grid pattern onto the surface of the object; photographing means for photographing the grid pattern projected onto the object surface through the reference grid and obtaining an image of moiré fringes; rotation means for rotating the reference grid about an axis normal to a grid surface of the reference grid; and analysis means for analyzing the shape of the object surface based on information about a rotation angle of the reference grid and intensity of the moiré fringes.

In another aspect of the invention, a surface shape measurement apparatus for measuring a shape of a surface of an object to be examined is provided with: a stage on which the object is rest; a grid plate having a reference grid and being disposed in parallel to the stage; an illumination unit placed opposite to the stage with respect to the grid plate such that light obliquely enters the object surface through the reference grid; a photographing unit placed opposite to the stage with respect to the grid plate such that the light from the object surface is received through the reference grid and that an image of moiré fringes is obtained; a rotation unit which rotates the grid plate so as to rotate the reference grid about an axis normal to a grid surface of the reference grid; and an analysis unit which analyzes the shape of the object surface based on information about a rotation angle of the reference grid and intensity of the moiré fringes.

Additional objects and advantages of the invention are set forth in the following description, are obvious from the description, or may be learned by practicing the invention. The objects and advantages of the invention may be realized and attained by means of instrumentalities and combinations particularly pointed out in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
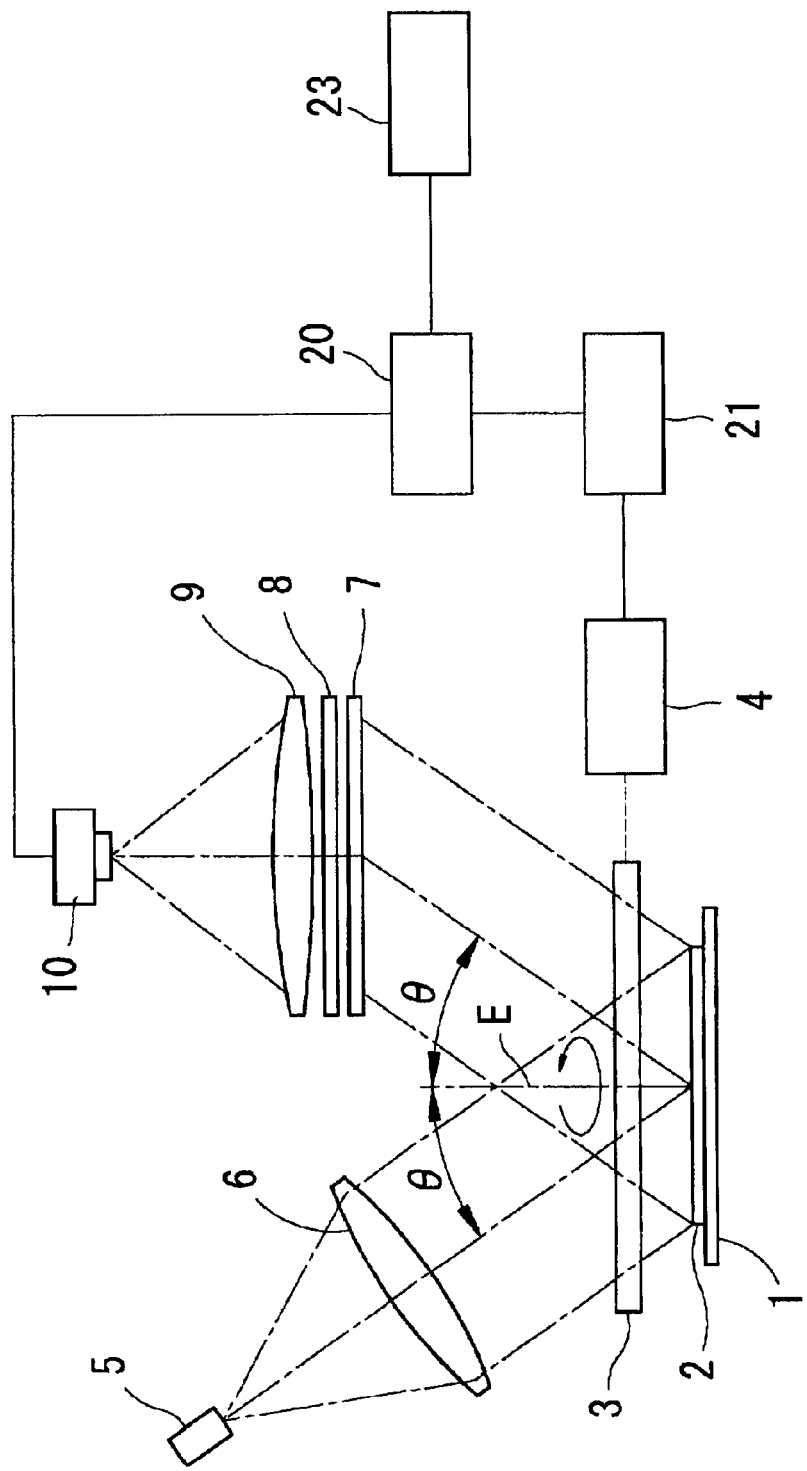
FIG. 1 is a view showing a schematic configuration of a surface shape measurement apparatus according to the present invention.

A detailed description of a preferred embodiment according to the present invention will now be given referring to the accompanying drawings. FIG. 1 is a view showing a schematic configuration of a surface shape measurement apparatus consistent with the present invention.

A wafer 2 as an object to be examined is rest on a stage 1 for examination. A grid plate 3 has a reference grid for generating moiré fringes. The reference grid is formed with a predetermined spacing on an undersurface of a transparent glass plate. The grid plate 3 is of a larger size than a surface of the wafer 2 (a surface to be examined). In addition, the grid plate 3 is disposed in parallel to the stage 1 (the surface of the wafer 2), and is rotated about a reference axis E perpendicular to its grid surface by a rotation device 4. The rotation device 4 comprises a holding member for keeping the grid plate 3 in parallel to the stage 1, a motor for rotating the holding member about the reference axis E, and the like.

A light source 5 emits light for illuminating the grid plate 3. The light source used as the light source 5 should emit light with wavelengths having high transmittance with respect to a base material (e.g. a transparent glass plate) constituting the grid plate 3. A collimator lens 6 makes the light emitted from the light source 5 approximately parallel light of which diameter is large enough to illuminate all of the grid plate 3. The light then illuminates the surface of the wafer 2 via the grid plate 3. If the object to be examined has a specular surface, an angle of incidence θ of the illumination light with respect to the grid plate 3 is preferably set at a Brewster's angle of the base material constituting the grid plate 3.

A Fresnel plate 7 bends the light reflected from the surface of the wafer 2 in an arbitrary direction. Reference numerals 8 and 9 indicate a screen onto which moiré fringes are projected and a field lens, respectively. A CCD camera 10 is used to photograph the moiré fringes. Via the Fresnel plate 7, a photographing optical axis of the camera 10 is set in a direction of an angle of reflection with respect to the angle of incidence θ of an illumination optical axis.

An analysis part 20 captures an image obtained from the camera 10 to analyze a surface shape of the wafer 2. A control part 21 drives and controls the rotation device 4, and is connected with the analysis part 20. A monitor 23 displays the image obtained from the camera 10 and a result of the analysis.

Next, operations of the present apparatus will be explained. The collimator lens 6 makes the light from the light source 5 approximately parallel light to illuminate the surface of the wafer 2 via the grid plate 3, so that a grid pattern is projected on the surface of the wafer 2. When the grid pattern projected on the surface of the wafer 2 is viewed through the grid plate 3 from a direction in which incident light is reflected, moiré fringes are observed. The light reflected off the surface of the wafer 2 passes through the grid plate 3, and travels to the screen 8 through the Fresnel plate 7. Thus, the moiré fringes are projected onto the screen 8, which is then photographed using the camera 10 via the field lens 9.

The moiré-fringe image obtained from the camera 10 is captured into a memory included in the analysis part 20. The control part 21, in turn, drives and controls the rotation device 4 to rotate the grid plate 3, making a change in the moiré-fringe image to be captured into the analysis part 20. The analysis part 20 receives input of information about an angle of the rotation, and it also analyzes light intensity of the moiré-fringe image that changes in accordance with the rotation of the grid plate 3. Then the surface shape of the wafer 2 is measured (analyzed) based on an analytical result of the moiré-fringe intensity and the information about the rotation angle of the grid plate 3.

Figure 2:
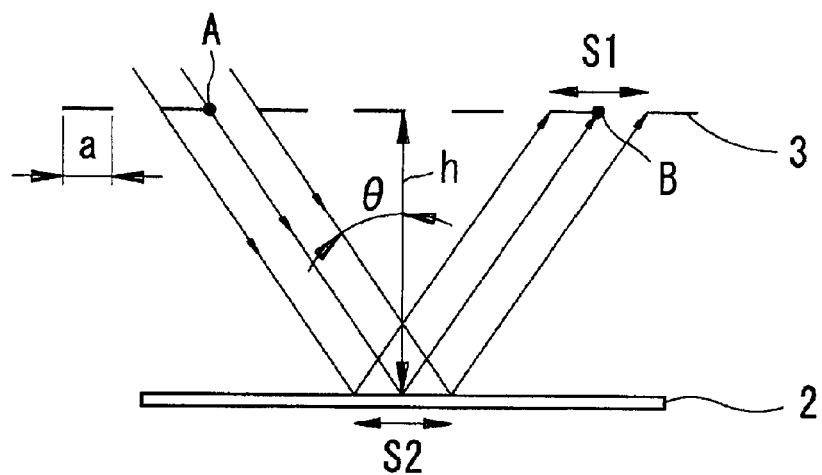
FIG. 2 is a view depicting a method for analyzing a surface shape.

Next, a method for analyzing a surface shape using the present apparatus will now be described referring to FIGS. 2 to 5. In FIG. 2, reference letter a indicates a spacing of the grid formed on the grid plate 3, and θ indicates an incident angle of the light. In addition, S1 and S2 are envisioned to represent a minute region of the grid plate 3 and that of the surface of the wafer 2, respectively. Further, h indicates a height of the grid surface of the grid plate 3 above the center of the minute region S2. Furthermore, a point A is given on the grid plate 3, and a point B is designated at a position where the incident light reenters the grid plate 3 after having passed through the point A and reflected off the surface of the wafer 2. Here, an equation S1=S2 may hold under the assumption that the grid plate 3 and the surface of the wafer 2 are nearly parallel to each other.

At this time, the light reflected off S2 reenters the grid plate 3 to generate moiré fringes on S1. That is, information about a surface shape of S2 is presented on S1. In addition, the following relational expression holds based on FIG. 2:
(Expression 1)

$$AB = 2 \times h \times \tan\theta$$

Figure 3:
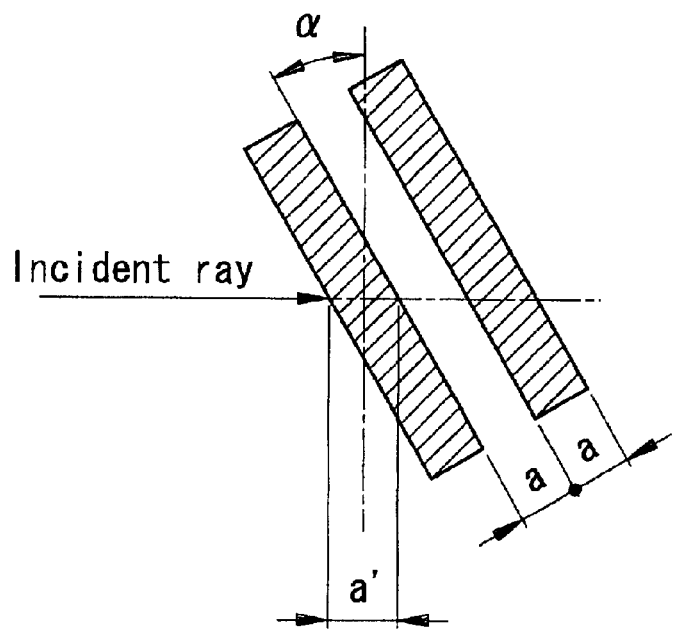
FIG. 3 is a view depicting the method for analyzing the surface shape.

On the other hand, the grid plate 3 is rotated on a plane parallel to the surface of the wafer 2. As shown in FIG. 3, when a rotation angle of the grid plate 3 is set at an arbitrary rotation angle α, a grid spacing a' in a cross section of the incident light may be expressed as follows:
(Expression 2)

$$a' = a / \cos\alpha$$

Figure 4:
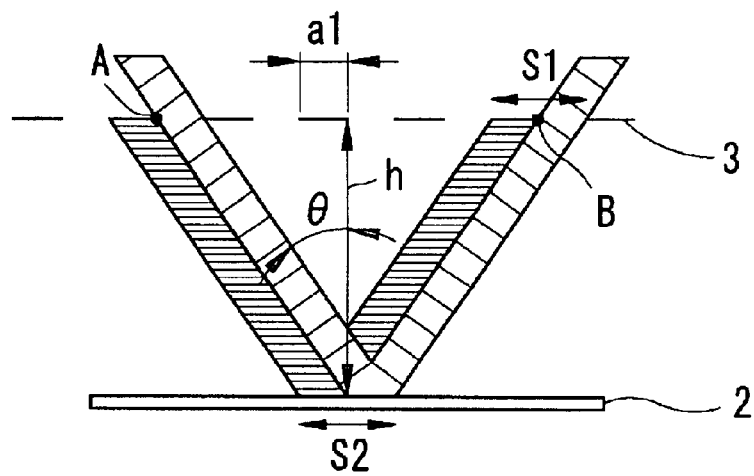
FIG. 4 is a view depicting the method for analyzing the surface shape.

Now, FIG. 4 holds true provided that the grid plate 3 is rotated an arbitrary rotation angle α1 in such a manner that the light intensity measured on the minute region S1 may rise to a maximum. If the grid spacing on the cross section of the incident light is represented as a1, the following relational expression holds based on FIG. 4:
(Expression 3)

$$AB = 2 \times h \times \tan\theta = n1 \times a1$$

*n1 is an integer

Figure 5:
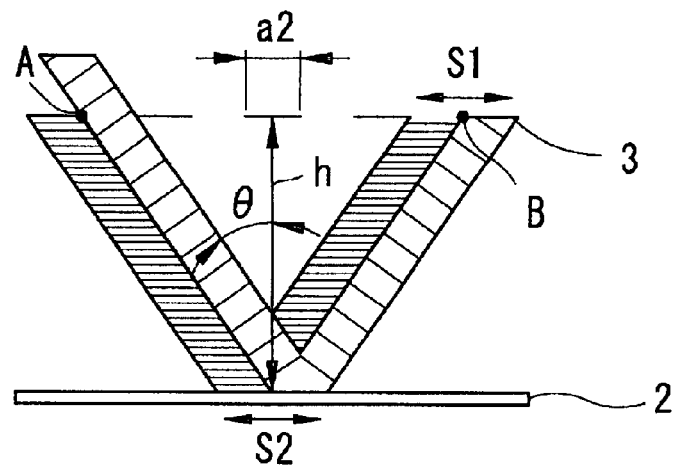
FIG. 5 is a view depicting the method for analyzing the surface shape.

Next, FIG. 5 holds true provided that the grid plate 3 is rotated an arbitrary rotation angle α2 in such a manner that the light intensity measured on the minute region S1 may fall down to a minimum. If the grid spacing on the cross section of the incident light is represented as a2, the following relational expression holds based on FIG. 5:
(Expression 4)

$$AB = 2 \times h \times \tan\theta = n2 \times a2$$

n1 is an integer

In addition, if the rotation of the grid plate 3 starts from the rotation angle a1 (which gives maximum light intensity in S1) and continues to the rotation angle α2 where the light intensity in S1 minimizes, the following relational expression holds:
(Expression 5)

$$n2 = n1 + 1$$

Putting the above-mentioned relational expressions 1 to 5 together, the height h may be expressed as follows:
(Expression 6)

$$h = \frac{1}{2 \times \tan(\theta)} \times \left(\frac{a1 \times a2}{a1 - a2}\right)$$

The minute region S1 for actual measurement may be considered as a region equivalent to a picture element of the camera 10. The height h above the minute region S2 of the surface of the wafer 2 associated with S1 may be obtained from the two rotation angles α1 and α2, because the angles α1 and α2 are determined when the light intensity reaches a maximum and a minimum, respectively, measured at one picture element of the camera 10 while the grid plate 3 is rotated. Obtaining the values of h with respect to all over the surface of the wafer 2 may provide the information about the surface shape (asperity) of the wafer 2.

The above-described method is used to analyze the surface shape of the wafer 2. Assuming that the rotation angle is 0 degrees when the incident light is normal to the lengthwise direction of the grid on the grid plate 3, the rotation device 4 rotates the grid plate 3 in predetermined increments of angular degrees. At each angle of rotation, the moiré-fringe image obtained from the camera 10 is captured in sequence into the memory of the analysis part 20. With respect to each picture element, the analysis part 20 detects the rotation angles α1 and α2 at which the light intensity reaches a maximum and a minimum, respectively. The detected angles α1 and α2 are applied in the foregoing relational expression 6 to obtain information about the height above the target picture element. It should be noted that the rotation angles α1 and α2 are found within one cycle of changes in the moiré-fringe intensity. The analytical result is presented as a bird's eye view or a contour map on the monitor.

Accordingly, the rotation angles α1 and α2 may be detected if contrast changes of the moiré fringes for one cycle are obtained. Therefore, the grid plate 3 does not always have to be rotated as much as a half-turn; it may be rotated only within a certain range. The range of rotation and its starting angle may be determined based on a relationship between a distance from the grid plate 3 to the wafer 2 and flatness (undulation) expected on the surface of the wafer 2.

In addition, the angular increment of rotation of the grid plate 3 may be an angle of one degree or more, and the rotation angles $\alpha 1$ and $\alpha 2$ may be determined through analysis of moiré-fringe intensity variation among a series of images. The angular increment of rotation may be set in relation to measurement accuracy.

As has fully been described up to this point, the present invention makes it possible to measure a shape of a surface of a large-sized object to be examined by a simple mechanism without needing to translate a reference grid for an infinitesimal distance.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A surface shape measurement apparatus for measuring a shape of a surface of an object to be examined, the apparatus comprising:

a stage on which the object is rested;

a reference grid disposed in parallel to the stage;

illumination means for illuminating the reference grid and projecting a grid pattern onto the surface of the object;

photographing means for photographing the grid pattern projected onto the object surface through the reference grid and obtaining an image of moiré fringes;

rotation means for rotating the reference grid about an axis normal to a grid surface of the reference grid; and analysis means for analyzing the shape of the object surface based on information about a rotation angle of the reference grid and intensity of the moiré fringes.

wherein, with respect to each position in the obtained image, the analysis means obtains information about the rotation angles, one of which is determined when the moiré-fringe intensity reaches a maximum and the other of which is determined when the moiré-fringe intensity reaches a maximum, and the analysis means further analyzes the shape of the object surface based on the information about both the rotation angles.

2. The surface shape measurement apparatus according to claim 1, further comprising display means for graphic display of an analytical result obtained from the analysis means.

3. A surface shape measurement apparatus for measuring a shape of a surface of an object to be examined, the apparatus comprising:

a stage on which the object is rested;

a grid plate having a reference grid and being disposed in parallel to the stage;

an illumination unit placed opposite to the stage with respect to the grid plate such that light obliquely enters the object surface through the reference grid;

a photographing unit placed opposite to the stage with respect to the grid plate such that the light from the object surface is received through the reference grid and that an image of moiré fringes is obtained;

a rotation unit which rotates the grid plate so as to rotate the reference grid about an axis normal to a grid surface of the reference grid; and an analysis unit which analyzes the shape of the object surface based on information about a rotation angle of the reference grid and intensity of the moiré fringes, wherein, with respect to each position in the obtained image, the analysis unit obtains information about the rotation angles, one of which is determined when the moiré-fringe intensity reaches a maximum and the other of which is determined when the moiré-fringe intensity reaches a minimum, and the analysis unit further analyzes the shape of the object surface based on the information about both the rotation angles.

4. The surface shape measurement apparatus according to claim 3, further comprising a display unit for graphic display of an analytical result obtained from the analysis unit.

5. A surface shape measurement apparatus for measuring a shape of a surface of an object, the apparatus comprising:

a stage on which the object is put;

a grid plate having a reference grid and placed in parallel to the stage;

an illumination light source placed opposite to the stage with respect to the grid plate so as to illuminate the object surface put on the stage with light via the grid plate;

a camera placed opposite to the stage with respect to the grid plate so as to receive the light reflected by the object surface via the grid plate and obtain moiré fringes;

a rotation unit which rotates the grid plate about an axis normal to a grid surface of the reference grid; and an analysis unit which analyzes the shape of the object surface based on each rotation angle of the grid plate at which maximum and minimum intensity of the moiré fringes is obtained with respect to each position of the moiré fringes.

6. The surface shape measurement apparatus according to claim 5, further comprising a lens placed between the light source and the grid plate and making the light from the light source approximately parallel light to illuminate the object surface put on the stage via the grid plate.

* * * * *